United States Patent
Shibuya et al.

(10) Patent No.: US 10,421,053 B2
(45) Date of Patent: Sep. 24, 2019

(54) HEAT TREATMENT DEVICE

(71) Applicant: IHI CORPORATION, Tokyo (JP)

(72) Inventors: Hideshi Shibuya, Tokyo (JP); Shigeki Sakakura, Tokyo (JP); Akihisa Yano, Tokyo (JP); Takahito Akita, Tokyo (JP); Taiga Yamamoto, Tokyo (JP); Tatsuya Oka, Tokyo (JP); Shunji Miyajima, Tokyo (JP); Yusuke Takeuchi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/389,125

(22) Filed: Apr. 19, 2019

(65) Prior Publication Data

US 2019/0247817 A1    Aug. 15, 2019

Related U.S. Application Data

(63) Continuation of application No. PCT/JP2017/043480, filed on Dec. 4, 2017.

(30) Foreign Application Priority Data

Dec. 8, 2016 (JP) ................. 2016-238373

(51) Int. Cl.
*B01J 8/02* (2006.01)
*B01J 19/00* (2006.01)
(Continued)

(52) U.S. Cl.
CPC ............. *B01J 8/0285* (2013.01); *B01J 35/04* (2013.01); *F28D 9/0006* (2013.01); *B01J 2219/2408* (2013.01); *B01J 2219/2412* (2013.01)

(58) Field of Classification Search
CPC ..... B01J 8/00; B01J 8/02; B01J 8/0285; B01J 2219/24–2403; B01J 2219/2408–2412; F28D 9/00; F28D 9/0006
See application file for complete search history.

(56) References Cited

U.S. PATENT DOCUMENTS 5,581,039 A    12/1996    Yasutomi et al.
2002/0045078 A1    4/2002    Kawasumi
(Continued)

FOREIGN PATENT DOCUMENTS

JP    H05-272849 A    10/1993
JP    H05-090155 U    12/1993
(Continued)

*Primary Examiner* — Natasha E Young

(57) ABSTRACT

A reactor as a heat treatment device includes heat transfer structures removably placed in first flow channels, a first information acquisition unit connected to the inlet side of the first flow channels to acquire information for specifying a temperature and a flow rate of the first fluid which are reference conditions after lapses of time, a second information acquisition unit connected to the outlet side of the first flow channels to acquire the information for specifying the temperature of the first fluid after each lapse of time, and a control unit that calculates a heat exchange amount after each lapse of time in accordance with the temperature and the flow rate specified according to the information acquired by the first information acquisition unit and the second information acquisition unit, so as to estimate a service life of the heat transfer structures in accordance with the heat exchange amount.

8 Claims, 7 Drawing Sheets

(51) Int. Cl.
*B01J 35/04* (2006.01)
*F28D 9/00* (2006.01)

(56) References Cited

U.S. PATENT DOCUMENTS

| | | | |
|---|---|---|---|
| 2008/0153169 A1* | 6/2008 | Hirata | B01F 5/0646 |
| | | | 436/55 |
| 2012/0089346 A1 | 4/2012 | Huyse | |
| 2013/0340976 A1 | 12/2013 | Kamiyama et al. | |
| 2014/0126981 A1* | 5/2014 | Le Sueur | B01J 19/249 |
| | | | 414/226.04 |
| 2016/0046497 A1 | 2/2016 | Forsyth et al. | |

FOREIGN PATENT DOCUMENTS

| | | |
|---|---|---|
| JP | H06-102223 A | 4/1994 |
| JP | H11-236215 A | 8/1999 |
| JP | 3885479 B2 | 2/2007 |
| JP | 2007-054817 A | 3/2007 |
| JP | 4963061 B2 | 6/2012 |
| JP | 2012-215335 A | 11/2012 |
| JP | 5656746 B2 | 1/2015 |
| JP | 2015-038422 A | 2/2015 |
| JP | 2016-508112 A | 3/2016 |
| WO | 2014/109236 A1 | 7/2014 |

* cited by examiner

C-C

HEAT TREATMENT DEVICE

CROSS REFERENCE TO RELATED APPLICATIONS

This application is a continuation application of International Application No. PCT/JP2017/043480, now WO/2018/105557, filed on Dec. 4, 2017, which claims priority to Japanese Patent Application No. 2016-238373, filed on Dec. 8, 2016, the entire contents of which are incorporated by reference herein.

BACKGROUND

1. Technical Field

The present disclosure relates to a heat exchanger-type heat treatment device.

2. Description of the Related Art

Reactors are known as heat exchanger-type heat treatment devices to heat or cool, using a heat medium, a reaction fluid in a gas or liquid state containing a reaction raw material as a reactant so as to promote a reaction of the reactant. For example, a stacked reactor of this type is known to include a heat exchange unit including first heat transfer bodies and second heat transfer bodies alternately stacked on one another, each first heat transfer body including reaction flow channels through which a reaction fluid flows, and each second heat transfer body including heat medium flow channels through which a heat medium flows.

Such a stacked reactor may include, as a heat transfer structure for improving or keeping heat exchange performance, a heat transfer promoter in the respective heat medium flow channels for promoting heat transfer between the heat medium flowing through the heat medium flow channels and the respective second heat transfer bodies provided with the heat medium flow channels. The stacked reactor may also include a catalyst body for promoting the reaction in the respective reaction flow channels. The heat transfer promoter, which is placed under high temperature conditions during reaction treatment, for example, is inevitably degraded with the passage of time. Similarly, the catalyst body is inevitably degraded with the passage of time when the reaction treatment is continuously performed. The heat transfer promoter and the catalyst body thus each have a service life which is a period after which these elements are not used appropriately for the original purpose.

Japanese Unexamined Patent Application Publication No. H06-102223 (Patent Document 1) discloses an apparatus for estimating a life of a sintered ceramic body, which is an industrial apparatus differing from a heat treatment device, to deal with the remaining service life of the element included in the apparatus. This apparatus includes a conductive circuit inside the sintered body, and estimates the life of the sintered body in accordance with a change in resistance of the conductive circuit.

SUMMARY

Since no conventional heat treatment devices or methods using elements such as heat transfer promoters as described above can estimate a service life of the heat transfer promoters, the heat transfer promoters are replaced typically at timing roughly estimated from the experience of operators. The timing of replacement thus depends on the operators, and the elements such as the heat transfer promoters are not always replaced at appropriate timing. If an operator replaces the heat transfer promoters too early, the heat transfer promoters are to be discarded with the available service life remaining. If another operator replaces the heat transfer promoters too late, the performance of the heat treatment device decreases, leading to an economic loss.

The technology disclosed in Japanese Unexamined Patent Application Publication No. H06-102223 could be applied to a heat treatment device. The technology disclosed in Japanese Unexamined Patent Application Publication No. H06-102223, however, needs to preliminarily include the conductive circuit in the target to be estimated, which complicates the structure of the target itself. In addition, the technology disclosed in Japanese Unexamined Patent Application Publication No. H06-102223 cannot be simply applied directly to a heat treatment device such as a reactor, since the target to be estimated in Japanese Unexamined Patent Application Publication No. H06-102223 fundamentally differs in its technical purpose from the heat transfer structures which are expendable supplies such as the heat transfer promoters.

An object of the present disclosure is to provide a heat treatment device having a configuration capable of estimating a service life of heat transfer structures provided in flow channels so as to improve or keep heat exchange performance.

A heat treatment device according to an aspect of the present disclosure causes a first fluid and a second fluid to flow therethrough, the device including: a heat exchange unit including a first flow channel through which the first fluid flows and a second flow channel through which the second fluid flows; a heat transfer structure removably placed in the first flow channel; a first information acquisition unit connected to an inlet side or an outlet side of the first flow channel to acquire information for specifying a temperature, a flow rate, or a composition of the first fluid which is a reference condition after lapses of time; a second information acquisition unit connected to the outlet side of the first flow channel to acquire the information for specifying the temperature, the flow rate, or the composition of the first fluid after each lapse of time; and a control unit that calculates a heat exchange amount, a reaction rate, or a yield after each lapse of time in accordance with the temperature, the flow rate, or the composition specified according to the information acquired by the first information acquisition unit and the second information acquisition unit, so as to estimate a service life of the heat transfer structure in accordance with the heat exchange amount, the reaction rate, or the yield.

DESCRIPTION OF THE EMBODIMENTS

Figure 1:
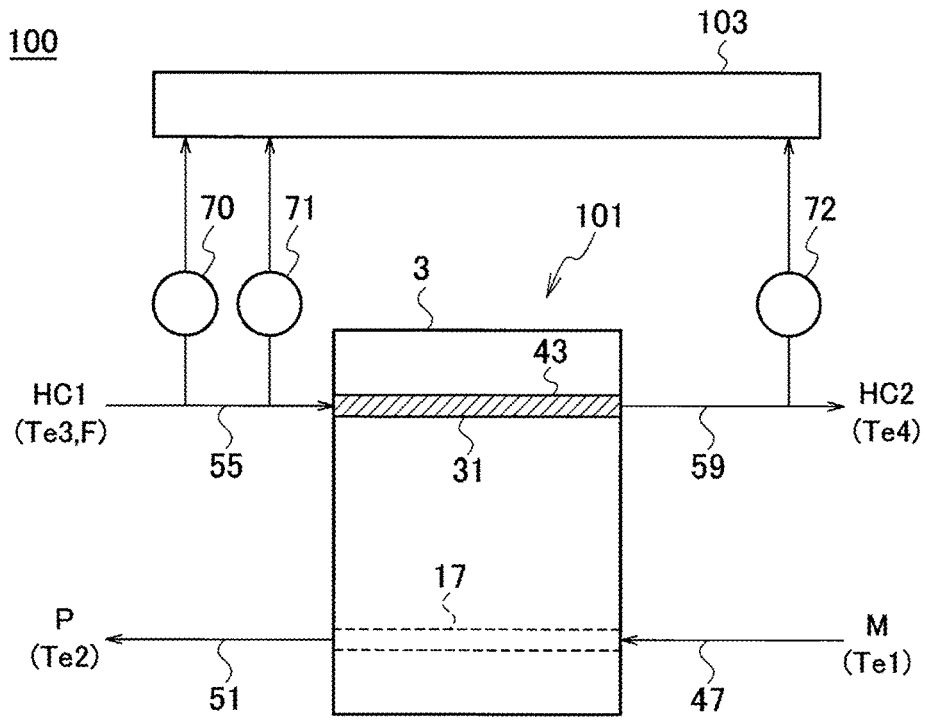
FIG. 1 is a diagram illustrating a structure of a second flow channel in a reactor according to a first embodiment.

Embodiments according to the present disclosure will be described in detail below with reference to the drawings. The following dimensions, materials, and specific numerical values described in the embodiments are shown for illustration purposes only, and the present disclosure is not limited thereto unless otherwise specified. The elements having substantially the same functions and structures illustrated in the description and the drawings are designated by the same reference numerals, and overlapping explanations are not repeated below. The elements described below but not related directly to the present disclosure are not shown in the drawings. In the following explanations of the drawings, a vertical direction is defined as a Z-axis, an extending direction of reaction regions in the first and second reaction flow channels described below on a plane perpendicular to the Z-axis is defined as a Y-axis, and a direction perpendicular to the Y-axis is defined as an X-axis.

Heat treatment devices illustrated in the respective embodiments are each a reactor that utilizes heat exchange between a first fluid and a second fluid, and heats or cools a reaction fluid in a gas state or in a liquid state containing a reaction raw material as a reactant so as to promote the reaction of the reactant. According to the respective embodiments, the first fluid is presumed to be a reaction fluid, and the second fluid is presumed to be a heat medium. In particular, the reaction fluid supplied to a reaction unit 101 described in detail below is raw material gas M. A third fluid containing a product and discharged from the reaction unit 101 after being subjected to reaction treatment is reaction gas P. The heat medium HC is a heating fluid. In particular, the heating fluid supplied to the reaction unit 101 is heating gas HC1, and the heating fluid emitted from the reaction unit 101 is heating emission gas HC2.

First Embodiment

Figure 2:
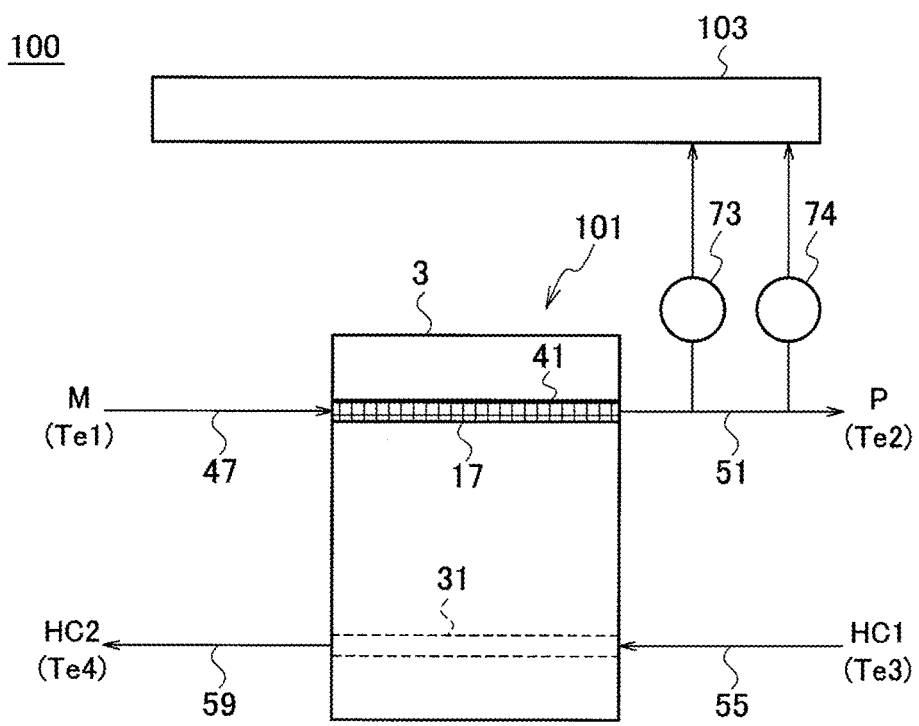
FIG. 2 is a diagram illustrating a structure of a first flow channel in the reactor according to the first embodiment.

FIG. 1 and FIG. 2 are schematic views each illustrating a structure of a reactor 100 according to the first embodiment. FIG. 1 illustrates a structure of a flow pipe of the heating gas HC1 or the heating emission gas HC2 passing through a second flow channel 31 included in a heat exchange unit 3 described in detail below. FIG. 2 illustrates a structure of a flow pipe of the raw material gas M or the reaction gas P passing through a first flow channel 17 included in the heat exchange unit 3. The reactor 100 includes a first gas supply unit (not shown) and a second gas supply unit (not shown). The first gas supply unit supplies the raw material gas M to the reaction unit 101. The second gas supply unit supplies the heating gas HC1 to the reaction unit 101.

Figure 3:
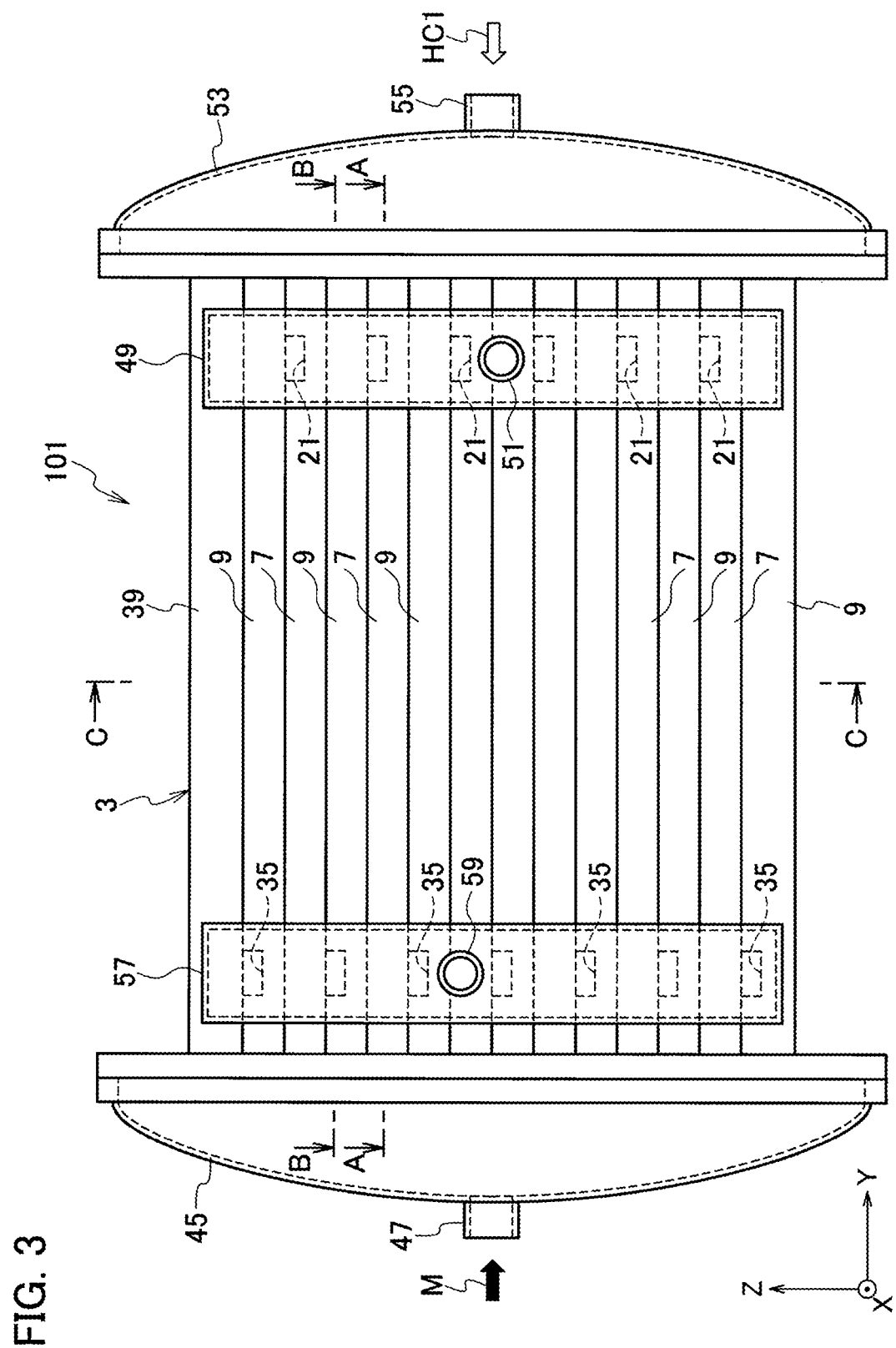
FIG. 3 is a side view illustrating a structure of a reaction unit.

FIG. 3 is a side view illustrating a structure of the reaction unit 101. The reaction unit 101 executes reaction treatment to produce a product from the raw material gas M. The reaction unit 101 includes a heat exchange unit 3 as a main body.

The heat exchange unit 3 includes a plurality of first heat transfer bodies 7, a plurality of second heat transfer bodies 9, and a lid body 39. The first heat transfer bodies 7 include reaction flow channels through which the reaction fluid flows. The second heat transfer bodies 9 include heat medium flow channels through which the heat medium flows. The heat exchange unit 3 has a counter flow-type structure in which the reaction fluid flows in the direction opposite to the heat medium. The first heat transfer bodies 7, the second heat transfer bodies 9, and the lid body 39 are each a plate-like member made of a heat transfer material having thermal resistance.

Figure 4:
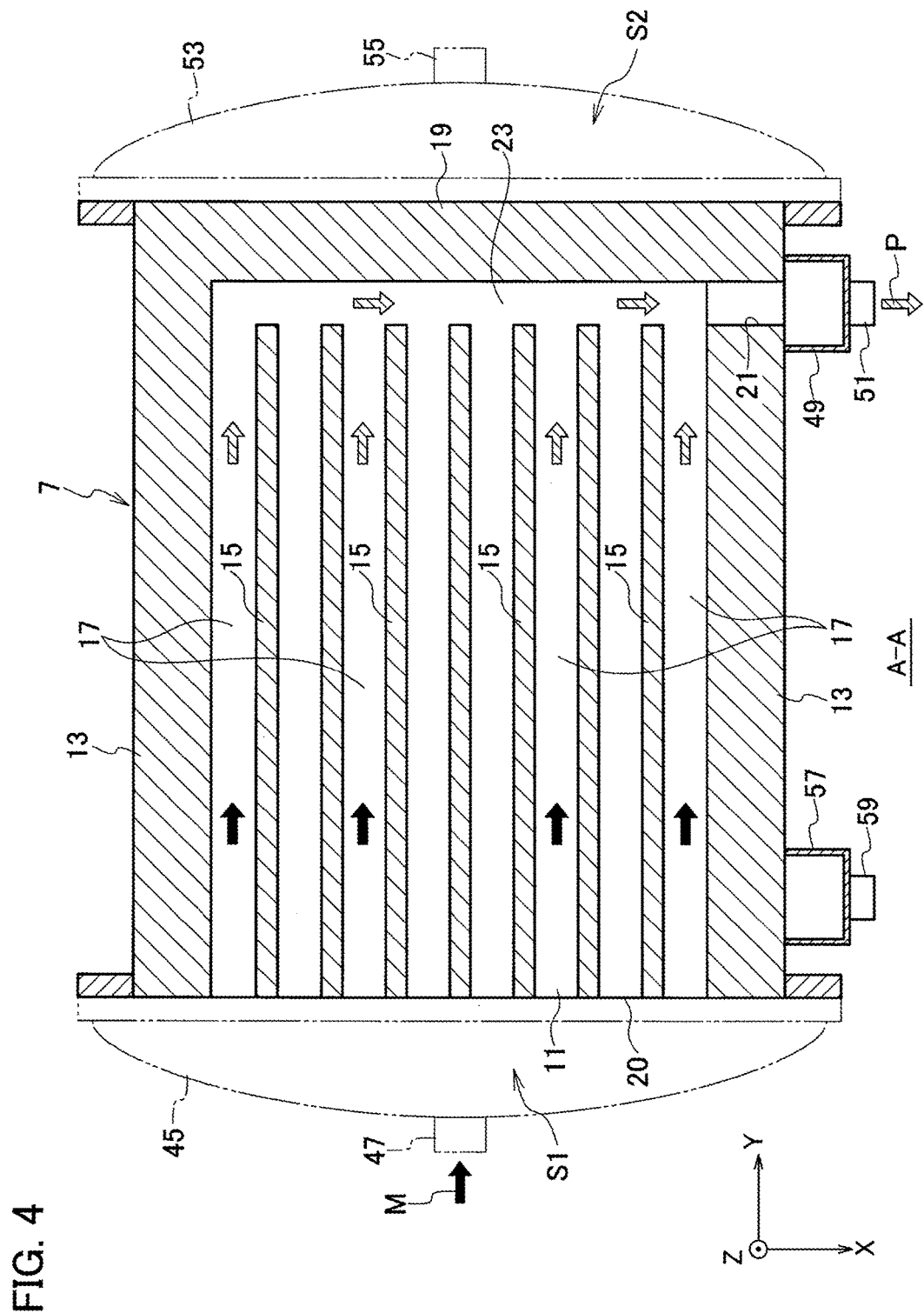
FIG. 4 is a plan view illustrating a structure and a shape of a part including a first heat transfer body in the reaction unit.

FIG. 4 is a plan view corresponding to a view taken along line A-A in FIG. 3, and showing a structure and a shape of a part including the first heat transfer body 7. Each of the first heat transfer bodies 7 includes a plurality of first flow channels 17 serving as reaction flow channels including reaction regions. The first flow channels 17 include the reaction regions in the middle portions thereof. The first flow channels 17 receive heat supplied from the heat medium flowing through second flow channels in the second heat transfer bodies 9 described below to cause the raw material gas M to react, so as to produce a product. Each of the first flow channels 17 is a groove having a rectangular shape in cross section. In particular, the upper side of the first flow channels 17 in the Z direction is open. Each of the first flow channels 17 has a first side surface open on one side of the respective first heat transfer bodies 7. The first flow channels 17 extend straight from first introduction ports 20 from which the raw material gas M is introduced to a portion immediately in front of a second side surface on the other side of the respective first heat transfer bodies 7 in the Y direction. The first flow channels 17 are arranged at regular intervals in the X direction. FIG. 1 and FIG. 2 each illustrate only one first flow channel 17 in the heat exchange unit 3 included in the reaction unit 101.

The first heat transfer bodies 7 each include a first base 11, two first side walls 13, a plurality of first interposition walls 15, and a first partition wall 19. The first base 11 is a rectangular plate wall portion covering the entire X-Y plane of the respective first heat transfer bodies 7. The first side walls 13 are wall portions provided on both the right and left sides of the extending direction of the first flow channels 17 on one of the main surfaces of the first base 11 perpendicular to the Z direction. The respective interposition walls 15 are wall portions interposed between the two first side walls 13 on one of the main surfaces of the first base 11. The respective interposition walls 15 are arranged at regular intervals parallel to the two first side walls 13. The first partition wall 19 extends in the X direction orthogonal to the extending direction of the first flow channels 17 on the second side surface side on one of the main surfaces of the first base 11. If the first flow channels 17 extend to the second side surface, the first flow channels 17 would reach a second space S2 described below in which the heating gas HC1 is introduced. The provision of the first partition wall 19 changes the flowing direction of the raw material gas M and the product passing through the respective first flow channels 17. The height of each of the first side walls 13, the first interposition walls 15, and the first partition wall 19 in the Z direction is the same.

The first heat transfer bodies 7 each include a first communication flow channel 23 extending along the inner surface of the first partition wall 19. The first communication flow channel 23 communicates with the respective first flow channels 17. The first communication flow channel 23 also communicates at one end with a first discharge port 21 provided at one of the first side walls 13, so as to discharge the product to the outside of the respective first heat transfer bodies 7. Although the first communication flow channel 23 is indicated separately from the first flow channels 17, for illustration purposes, the first communication flow channel 23 and the first flow channels 17 are the same kind of channels having the same function to allow the raw material gas M and the product to flow therethrough with no particular difference. The reaction gas P discharged from the first discharge port 21 contains the product produced in the first flow channels 17. The reaction gas P discharged from the first discharge port 21 may include the raw material gas M not used for the reaction.

Figure 5:
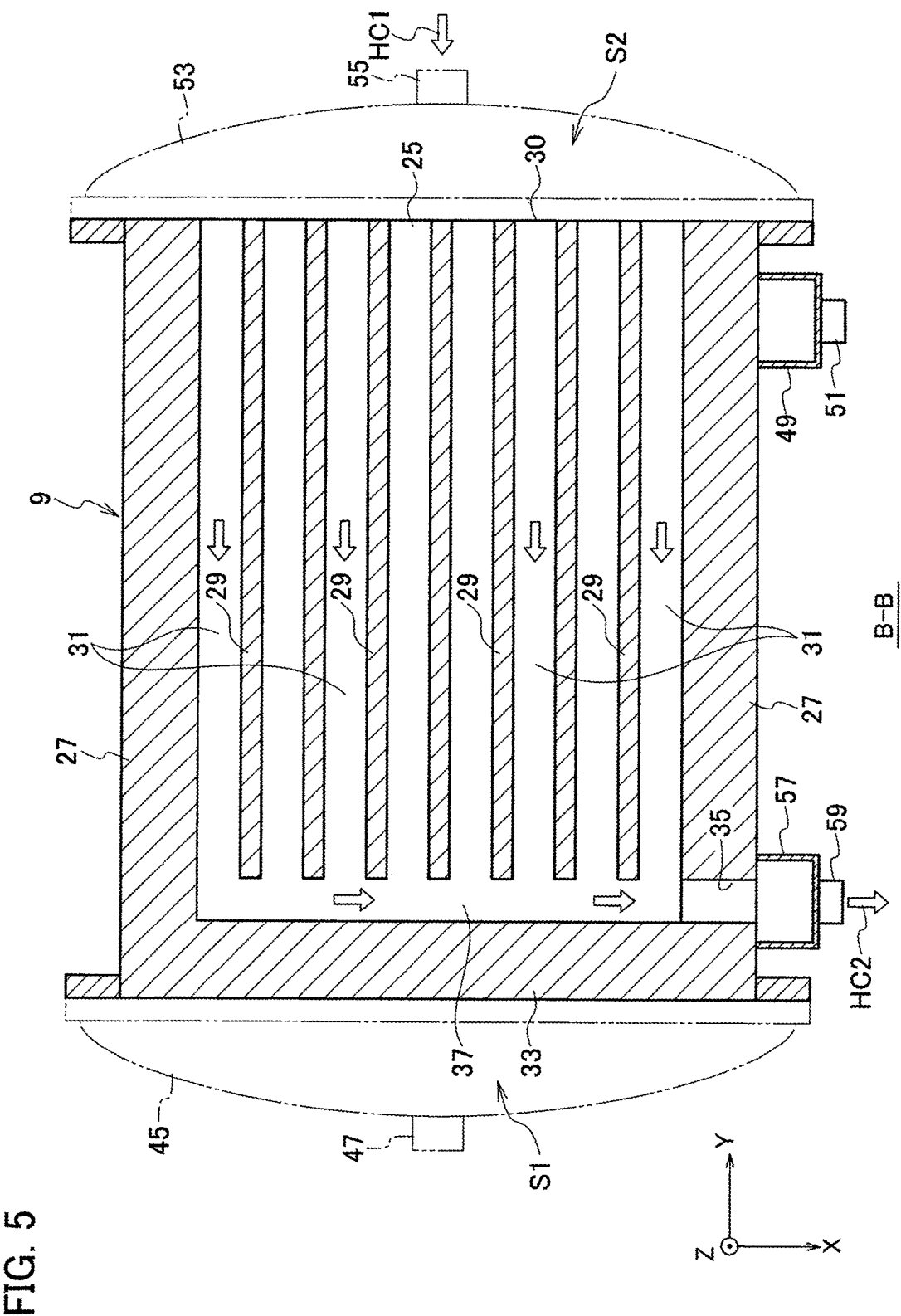
FIG. 5 is a plan view illustrating a structure and a shape of a part including a second heat transfer body in the reaction unit.

FIG. 5 is a plan view corresponding to a view taken along line B-B in FIG. 3, and showing a structure and a shape of a part including the second heat transfer body 9. Each of the second heat transfer bodies 9 includes a plurality of second flow channels 31 serving as heat medium flow channels. The second flow channels 31 supply heat supplied from the heating gas HC1 to the outside, namely, to the first heat transfer bodies 7. Each of the second flow channels 31 is a groove having a rectangular shape in cross section. In particular, the upper side of the second flow channels 31 in the Z direction is open. Each of the second flow channels 31 has a first side surface open on one side of the respective second heat transfer bodies 9. The second flow channels 31 extend straight from second introduction ports 30 from which the heating gas HC1 is introduced to a portion immediately in front of a second side surface on the other side of the second heat transfer bodies 9 in the Y direction. The first side surface of the respective second heat transfer bodies 9 is located on the opposite side of the first side surface of the respective first heat transfer bodies 7 described above in the Y direction. The second flow channels 31 are arranged at regular intervals in the X direction, as in the case of the first flow channels 17. FIG. 1 and FIG. 2 each illustrate only one second flow channel 31 in the heat exchange unit 3 included in the reaction unit 101.

The second heat transfer bodies 9 each include a second base 25, two second side walls 27, a plurality of second interposition walls 29, and a second partition wall 33. The second base 25 is a rectangular plate wall portion covering the entire X-Y plane of the respective second heat transfer bodies 9. The second side walls 27 are wall portions provided on both the right and left sides of the extending direction of the second flow channels 31 on one of the main surfaces of the second base 25 perpendicular to the Z direction. The respective interposition walls 29 are wall portions interposed between the two second side walls 27 on one of the main surfaces of the second base 25. The respective interposition walls 29 are arranged at regular intervals parallel to the second side walls 27. The second partition wall 33 extends in the X direction orthogonal to the extending direction of the second flow channels 31 on the second side surface side on one of the main surfaces of the second base 25. If the second flow channels 31 extend to the second side surface, the second flow channels 31 would reach a first space S1 described below in which the raw material gas M is introduced. The provision of the second partition wall 33 changes the flowing direction of the heating gas HC1 passing through the respective second flow channels 31. The height of each of the second side walls 27, the second interposition walls 29, and the second partition wall 33 in the Z direction is the same.

The second heat transfer bodies 9 each include a second communication flow channel 37 extending along the inner surface of the second partition wall 33. The second communication flow channel 37 communicates with the respective second flow channels 31. The second communication flow channel 37 also communicates at one end with a second discharge port 35 provided at one of the second side walls 27 so as to discharge the heating emission gas HC2 to the outside of the respective second heat transfer bodies 9.

Figure 6:
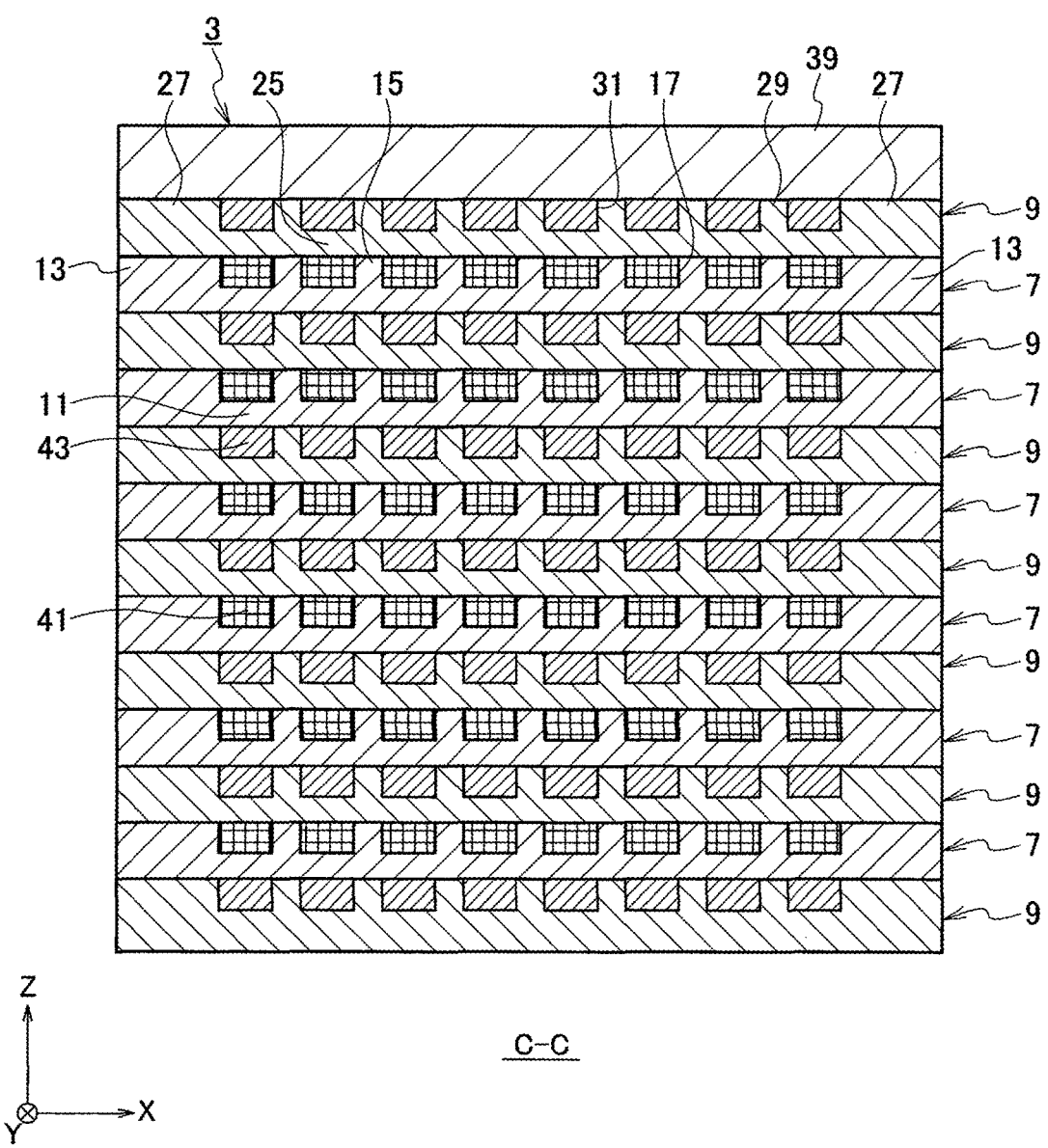
FIG. 6 is a cross-sectional view illustrating a shape and an arrangement of flow channels in the reaction unit.

FIG. 6 is a cross-sectional view of the heat exchange unit 3, corresponding to a view taken along line C-C in FIG. 3, illustrating the shape and the arrangement of the first flow channels 17 of the first heat transfer bodies 7 and the second flow channels 31 of the second heat transfer bodies 9. The heat exchange unit 3 is fabricated as a connected body or a stacked body such that the lid body 39 is arranged on the uppermost side in the Z direction, and the second heat transfer bodies 9 and the first heat transfer bodies 7 are alternately connected to and stacked with each other below the lid body 39. The first flow channels 17 and the second flow channels 31 are arranged adjacent to each other without contact via the first base 11 or the second base 25. When the heat exchange unit 3 is assembled, the respective members are fixed to each other by a bonding method such as tungsten inert gas (TIG) welding or diffusion bonding, so as to suppress a reduction in heat transfer derived from poor contact between the respective members.

The heat transfer material used for the respective elements included in the heat exchange unit 3 is preferably thermally-resistant metal such as an iron alloy or a nickel alloy. More particularly, the thermally-resistant alloy may be an iron alloy such as stainless steel, or a nickel alloy such as Inconel alloy 625 (registered trademark). Inconel alloy 617 (registered trademark), and Haynes alloy 230 (registered trademark). These preferable heat transfer materials have durability or corrosion resistance with respect to the fluid which can be used for promoting the reaction in the first flow channels 17 or used as a heat medium. However, the present embodiment is not limited to these materials. Alternatively, the heat transfer material may be iron-based plated steel, metal covered with thermally-resistant resin such as fluororesin, or carbon graphite.

Although the heat exchange unit 3 may be composed of at least a pair of one first heat transfer body 7 and one second heat transfer body 9, a larger number of the respective heat transfer bodies, as illustrated in the respective drawings, are preferably provided so as to improve the heat exchange performance. The number of the first flow channels 17 provided in each first heat transfer body 7 and the number of the second flow channels 31 provided in each second heat transfer body 9 may be determined as appropriate and may be changed in view of the designing conditions or heat transfer efficiency of the heat exchange unit 3. The heat exchange unit 3 may be covered with or surrounded by a housing or a heat insulator so as to suppress heat radiation to avoid heat loss.

The first flow channels 17 may be removably provided with catalyst bodies 41 for promoting the reaction. The catalyst bodies 41 are a kind of heat transfer structures capable of improving or keeping the heat exchange performance in the heat exchange unit 3 more effectively than a case without the catalyst bodies provided in the first flow channels 17. A catalyst included in the catalyst bodies 41 is selected as appropriate from substances mainly containing active metal effective in promotion of a chemical reaction, and suitable for the promotion of the reaction based on a synthesis reaction induced in the reaction unit 101. Examples of active metal as a catalytic component include nickel (Ni), cobalt (Co), iron (Fe), platinum (Pt), ruthenium (Ru), rhodium (Rh), and palladium (Pd). These metals may be used singly, or any combination of these metals that is effective in the promotion of the reaction may be used. The catalyst bodies 41 are prepared such that the catalyst is supported on a structure material, for example. The structure material is selected as appropriate from thermally-resistant metals which can be molded and support the catalyst. The structure, used as the catalyst bodies 41, may have a corrugated plate-like shape in a wave-like state or a shape in a sharply roughened state in cross section so as to increase the contact area with the reaction fluid. Examples of such thermally-resistant metals include iron (Fe), chromium (Cr), aluminum (Al), yttrium (Y), cobalt (Co), nickel (Ni), magnesium (Mg), titanium (Ti), molybdenum (Mo), tungsten (W), niobium (Nb), tantalum (Ta), and a thermally-resistant alloy mainly containing one of or some of these metals. The catalyst bodies 41 may be obtained such that a thin plate structure made of a thermally-resistant alloy such as Fecralloy (registered trademark) is molded. The catalyst may be supported directly on the structure material by surface modification or the like, or may be supported indirectly on the structure material via a carrier. Practically, the use of the carrier facilitates the process of supporting the catalyst. The carrier is selected as appropriate from materials having durability without impeding the promotion of the reaction and is capable of supporting the catalyst effectively, in view of the reaction induced in the reaction unit 101. The carrier may be a metal oxide such as alumina ($Al_2O_3$), titania ($TiO_2$), zirconia ($ZrO_2$), ceria ($CeO_2$), or silica ($SiO_2$). These metal oxides may be used singly, or some of these metal oxides may be selected and combined together. Examples of supporting methods using the carrier include a process of forming a mixed layer of the catalyst and the carrier on the surface of the structure material molded, and a process of forming a carrier layer and then supporting the catalyst on the carrier layer by surface modification or the like.

The second flow channels 31 may be removably provided with heat transfer promoters 43 for increasing the contact area with the heat medium to promote the heat transfer between the heat medium and the respective second heat transfer bodies 9. The heat transfer promoters 43 are also a kind of heat transfer structures capable of improving or keeping the heat exchange performance in the heat exchange unit 3 more effectively than a case without the heat transfer promoters provided in the second flow channels 31. The heat transfer promoters 43 are heat transfer fins, and may have a corrugated plate-like shape in order to ensure the contact area with the respective second heat transfer bodies 9. A heat transfer material used for the heat transfer promoters 43 may be metal such as aluminum, copper, stainless steel, and iron-based plated steel.

The reaction unit 101 further includes a reaction fluid introduction part 45 and a product discharge part 49, and a heat medium introduction part 53 and a heat medium discharge part 57.

The reaction fluid introduction part 45 is a casing curved concavely. The reaction fluid introduction part 45 covers the side surface of the heat exchange unit 3 on the side on which the first introduction ports 20 of the first flow channels 17 are open to define the first space S1 together with the heat exchange unit 3. The reaction fluid introduction part 45 is detachable or openable with respect to the heat exchange unit 3. The detachable or openable reaction fluid introduction part 45 allows the operator to insert or remove the catalyst bodies 41 into or from the first flow channels 17, for example. The reaction fluid introduction part 45 includes a first introduction pipe 47 through which the raw material gas M is introduced from the first gas supply unit (not shown). The first introduction pipe 47 is located in the middle on the side surface of the heat exchange unit 3, in particular, located in the middle on the X-Z plane, and is connected to the reaction fluid introduction part 45 in the same direction as the open direction of the respective first introduction ports 20. Such a structure can distribute the raw material gas M introduced from one portion to the respective first introduction ports 20.

The product discharge part 49 is a box-shaped casing with one surface open. The product discharge part 49 is arranged on a third side surface of the heat exchange unit 3 such that the open surface faces the respective first discharge ports 21 of the first heat transfer bodies 7. The product discharge part 49 includes a first discharge pipe 51 at a part of the wall portion thereof for discharging the reaction gas P containing the product to the outside of the reaction unit 101. The first discharge pipe 51 is connected to another external treatment device (not shown) for executing aftertreatment of the reaction gas P. The reaction gas P discharged from the respective first discharge ports 21 is thus recovered through the single first discharge pipe 51.

The heat medium introduction part 53 is a casing curved concavely, as in the case of the reaction fluid introduction part 45. The heat medium introduction part 53 covers the side surface of the heat exchange unit 3 on the side on which the second introduction ports 30 of the second flow channels 31 are open to define the second space S2 together with the heat exchange unit 3. The heat medium introduction part 53 is detachable or openable with respect to the heat exchange unit 3. The detachable or openable heat medium introduction part 53 allows the operator to insert or remove the heat transfer promoters 43 into or from the second flow channels 31, for example. The heat medium introduction part 53 includes a second introduction pipe 55 through which the heating gas HC1 is introduced from the second gas supply unit (not shown). The second introduction pipe 55 is located in the middle on the side surface of the heat exchange unit 3, in particular, located in the middle on the X-Z plane, and is connected to the heat medium introduction part 53 in the same direction as the open direction of the respective second introduction ports 30. Such a structure can distribute the heating gas HC1 introduced from one portion to the respective second introduction ports 30.

The heat medium discharge part 57 is a box-shaped casing with one surface open, as in the case of the product discharge part 49. The heat medium discharge part 57 is arranged on the third side surface of the heat exchange unit 3 such that the open surface faces the respective second discharge ports 35 of the second heat transfer bodies 9. The heat medium discharge part 57 includes a second discharge pipe 59 at a part of the wall portion thereof for discharging the heating emission gas HC2 to the outside of the reaction unit 101. The second discharge pipe 59 is connected to another external treatment device (not shown) for reusing the heating emission gas HC2. The heating emission gas HC2 discharged from the respective second discharge ports 35 is thus recovered through the single second discharge pipe 59.

The heat exchange body 3 may be any of a liquid-liquid heat exchanger, a gas-gas heat exchanger, and a gas-liquid heat exchanger, and the reaction fluid and the heat medium supplied to the reaction unit 101 may be either gas or liquid. The reaction unit 101 can cause chemical synthesis through various kinds of thermal reactions such as an endothermic reaction and an exothermic reaction. Examples of such thermal reactions causing synthesis include: a steam reforming reaction of methane as represented by the following chemical equation (1); an endothermic reaction such as a dry reforming reaction of methane as represented by the following chemical equation (2); a shift reaction as represented by the following chemical equation (3); a methanation reaction as represented by the following chemical equation (4); and a Fischer-Tropsch synthesis reaction as represented by the following chemical equation (5). The reaction fluid used in these reactions is in a gas state.

$$CH_4 + H_2O \rightarrow 3H_2 + CO \quad (1)$$

$$CH_4 + CO_2 \rightarrow 2H_2 + 2CO \quad (2)$$

$$CO + H_2O \rightarrow CO_2 + H_2 \quad (3)$$

$$CO + 3H_2 \rightarrow CH_4 + H_2O \quad (4)$$

$$(2n+1)H_2 + nCO \rightarrow C_nH_{2n+2} + nH_2O \quad (5)$$

The heat medium is preferably a substance not corroding the constituent materials of the reaction unit 101, and may be a gaseous substance such as combustion gas or heating air in the case of the heating gas according to the present embodiment. Alternatively, the heat medium may be a liquid substance such as water or oil. The gaseous substance used as the heat medium is easier to handle than the liquid medium.

The first gas supply unit (not shown) as a constituent element of the reactor 100 is connected to the first introduction pipe 47 to supply the raw material gas M toward the respective first flow channels 17 in the reaction unit 101. Hereinafter, a temperature of the raw material gas M passing through the first introduction pipe 47 before being introduced to the reaction unit 101 is indicated by "Te1".

The second gas supply unit (not shown) is connected to the second introduction pipe 55 to supply the heating gas HC1 toward the respective second flow channels 31 in the reaction unit 101. The heating gas HC1 is combustion gas, for example. In this case, the second gas supply unit includes a combustor for mixing fuel and air as appropriate to produce combustion gas.

As illustrated in FIG. 1, the reactor 100 includes a first temperature measurement unit 70 for measuring a temperature of the heating gas HC1 flowing through the pipe, and a flow rate measurement unit 71 for measuring a flow rate of the heating gas HC1. The first temperature measurement unit 70 and the flow rate measurement unit 71 are arranged in the second introduction pipe 55. Hereinafter, the temperature of the heating gas HC1 measured by the first temperature measurement unit 70 and passing through the second introduction pipe 55 before being introduced to the reaction unit 101 is indicated by "Te3". The flow rate of the heating gas HC1 measured by the flow rate measurement unit 71 is indicated by "F".

The reactor 100 also includes a second temperature measurement unit 72 for measuring a temperature of the heating emission gas HC2 flowing through the pipe. The second temperature measurement unit 72 is arranged in the second discharge pipe 59. Hereinafter, the temperature of the heating emission gas HC2 measured by the second temperature measurement unit 72 is indicated by "Te4".

As illustrated in FIG. 2, the reactor 100 includes a third temperature measurement unit 73 for measuring a temperature of the reaction gas P flowing through the pipe, and a composition analysis unit 74 for analyzing a composition of the reaction gas P. The third temperature measurement unit 73 and the composition analysis unit 74 are arranged in the first discharge pipe 51. Hereinafter, the temperature of the reaction gas P measured by the third temperature measurement unit 73 is indicated by "Te2", and the corresponding reaction rate is indicated by "r".

The composition analysis unit 74 is a gas chromatograph, for example. The gas chromatograph is an analysis instrument that identifies and quantitates compounds by chromatography. The gas chromatograph can be used when a stationary phase and a mobile phase are both gas, and is thus preferably used for analyzing the composition of the product contained in the reaction gas P in the present embodiment.

The reactor 100 further includes a control unit 103 for controlling the entire operation of the reactor 100. The control unit 103 according to the present embodiment is in particular electrically connected to the first temperature measurement unit 70, the second temperature measurement unit 72, the third temperature measurement unit 73, the flow rate measurement unit 71, and the composition analysis unit 74. The control unit 103 estimates a service life of each of the heat transfer promoters 43 and the catalyst bodies 41.

Next, the operations according to the present embodiment are described below.

A first operation of estimating a service life of the heat transfer promoters 43 is described below with reference to FIG. 1. The control unit 103 estimates a service life of the heat transfer promoters 43 in accordance with the information on the temperature or the flow rate acquired from the first temperature measurement unit 70, the flow rate measurement unit 71, or the second temperature measurement unit 72. First, the operator determines reference conditions for time-course measurement for the estimation, so as to cause the control unit 103 to start estimating the service life of the heat transfer promoters 43. According to the present embodiment, the respective values as examples of the reference conditions for the time-course measurement are determined as follows: the temperature Te3 of the heating gas HC is set to 875° C., the flow rate F of the heating gas HC1 is set to 39,600 kg/h, and specific heat $C_p$ is set to 1.2 kJ/(kg·° C.).

The control unit 103 then leads the reactor 100 to be in operation, acquires the information on the temperature from the first temperature measurement unit 70, and determines whether the temperature Te3 of the heating gas HC1 reaches the preliminarily set temperature. The control unit 103 also acquires the information on the flow rate from the flow rate measurement unit 71, and determines whether the flow rate F of the heating gas HC1 reaches the predetermined flow rate. For the estimation of the service life of the heat transfer promoters 43, the first temperature measurement unit 70 and the flow rate measurement unit 71 serve as a first information acquisition unit for acquiring the information about the reference conditions at the time elapsed.

When the control unit 103 determines that the reference conditions are fulfilled, the control unit 103 starts the normal operation to execute the reaction treatment. The control unit 103 then acquires the information on the temperature of the heating emission gas HC2 from the second temperature measurement unit 72 sequentially after each lapse of 500 hours, 4,000 hours, 8,000 hours, 12,000 hours, and 16,000 hours from the start of the operation, and stores the temperature Te4 at each point. For the estimation of the service life of the heat transfer promoters 43, the second temperature measurement unit 72 serves as a second information acquisition unit for acquiring the information after each lapse of time. The values of the temperature Te4 measured after each lapse of time are 609.8° C., 612.0° C., 611.1° C., 617.4° C., and 619.0° C.

The control unit 103 then calculates the heat exchange amount q based on the temperature Te4 of the heating emission gas HC2 measured after each lapse of time. The heat exchange amount q can be calculated according to the following equation (6).

$$q = w \cdot C_p \cdot \Delta T \quad (6)$$

where w is a mass flow rate, $C_p$ is the specific heat, and $\Delta T$ is a difference between the temperature Te3 of the heating gas HC1 and the temperature Te4 of the heating emission gas HC2.

The heat exchange amounts q after each lapse of time calculated according to the equation (6) are 3,501 kW, 3,472 kW, 3,483 kW, 3,400 kW, and 3,379 kW. The control unit 103 calculates an approximate equation representing a relation between the lapse of time t and the heat exchange amount q using the respective values. The approximate equation thus obtained is expressed by the following equation (7).

$$q = -3.48 \times 10^{-7} t^2 - 2.35 \times 10^{-3} t + 3.50 \times 10^3 \quad (7)$$

Figure 7:
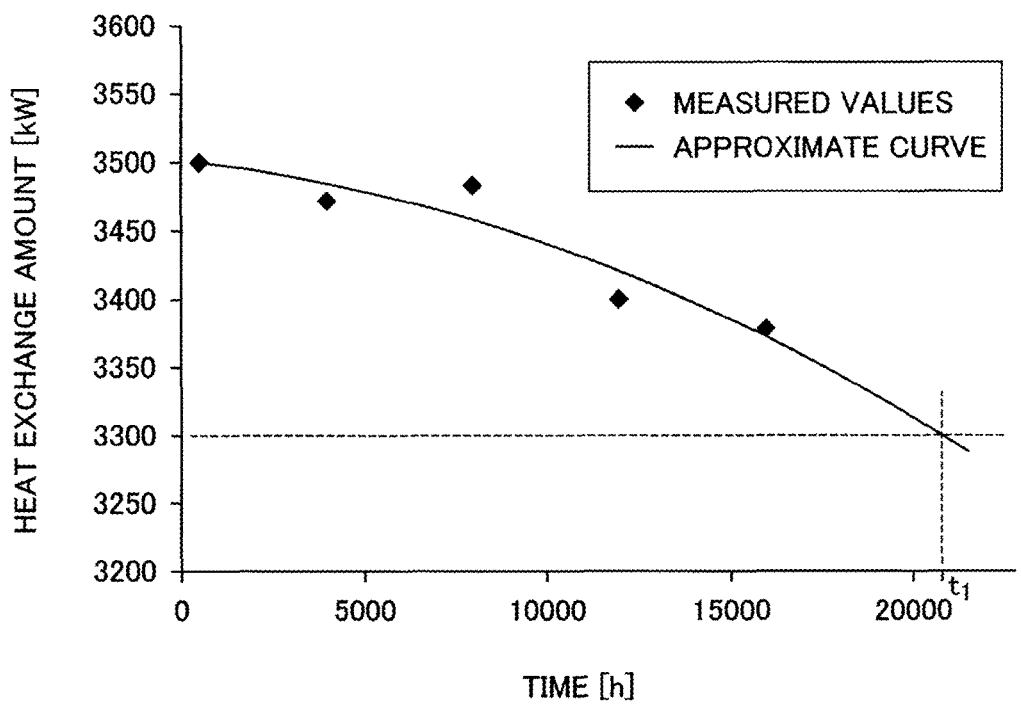
FIG. 7 is a graph of an approximate curve used for estimating a service life of a heat transfer promoter.

FIG. 7 is a graph showing the relation between the lapse of time t (h) and the heat exchange amount q (kW). FIG. 7 indicates the respective measured values of the heat exchange amounts q after each lapse of time t. FIG. 7 also indicates an approximate curve representing the equation (7) calculated using the respective measured values.

A threshold of the heat exchange amount q at the time when the heat transfer promoters 43 need to be replaced is set to be 3,300 kW, for example. This threshold is preliminarily determined by the operator, and is stored in the control unit 103. The control unit 103 applies the threshold to the equation (7) to calculate the corresponding time $t_1$, as illustrated in FIG. 7. In this example, the time $t_1$ thus obtained is 20,833 hours, which is the service life of the heat transfer promoters 43 when the reactor 100 executes the reaction treatment under the predetermined conditions. The operator recognizes the service life so as to presume the remaining time during which the heat transfer promoters 43 can be used. If the reactor 100 has been operated for 16,000 hours at the moment, for example, the remaining time allowed then can be presumed to be 4,833 hours.

A second operation of estimating a service life of the catalyst bodies 41 is described below with reference to FIG. 2. The control unit 103 estimates a service life of the catalyst bodies 41 in accordance with the information on the temperature acquired from the third temperature measurement unit 73 and the composition of the product in the reaction gas P analyzed by the composition analysis unit 74. First, the operator determines reference conditions for time-course measurement for the estimation, so as to cause the control unit 103 to start estimating the service life of the catalyst bodies 41. According to the present embodiment, the temperature Te2 of the reaction gas P as an example of the reference conditions for the time-course measurement is set to 850° C.

The control unit 103 then leads the reactor 100 to be in operation, acquires the information on the temperature from the third temperature measurement unit 73, and determines whether the temperature Te2 of the reaction gas P reaches the preliminarily set temperature. For the estimation of the service life of the catalyst bodies 41, the third temperature measurement unit 73 corresponds to the first information acquisition unit for acquiring the information about the reference conditions of the time elapsed.

When the control unit 103 determines that the reference conditions are fulfilled, the control unit 103 starts the normal operation to execute the reaction treatment. The control unit 103 then causes the composition analysis unit 74 to analyze the composition of the reaction gas P sequentially after each lapse of 500 hours, 4,000 hours, 8,000 hours, 12,000 hours, and 16,000 hours from the start of the operation, and stores the information at each point. For the estimation of the service life of the catalyst bodies 41, the composition analysis unit 74 corresponds to the second information acquisition unit for acquiring the information after each lapse of time. Table I lists the respective compositions of the reaction gas P specified after each lapse of time.

TABLE 1

| Lapse of time [h] | Composition of reaction gas [mol %] | | | | |
|---|---|---|---|---|---|
| | $CH_4$ | $H_2O$ | $H_2$ | CO | $CO_2$ |
| 500 | 2.5 | 32.2 | 49.9 | 5.5 | 9.9 |
| 4000 | 2.7 | 32.4 | 50.1 | 5.4 | 9.4 |
| 8000 | 2.6 | 32.3 | 50.2 | 5.4 | 9.5 |
| 12000 | 2.8 | 32.6 | 49.8 | 5.5 | 9.3 |
| 16000 | 3.1 | 32.9 | 49.4 | 5.6 | 9 |

The control unit 103 then calculates the reaction rate r based on the respective compositions of the reaction gas P specified after each lapse of time. As used herein, the term "reaction rate r" refers to the amount of the raw material contained in the reaction gas P as a product with respect to the amount of the raw material contained in the raw material gas M, namely, refers to the amount of the raw material actually used in the reaction for producing the product. The reaction rate r according to the present embodiment is expressed by the following equation (8). The reaction rate r varies depending on the type of the reaction. The reaction rate r is determined as appropriate while taking account of a yield calculated on the basis of selectivity of a plurality of reactions when the reactions are executed simultaneously, for example.

$$\text{Reaction rate} = (\text{CO concentration} + CO_2 \text{ concentration}) / (\text{CO concentration} + CO_2 \text{ concentration} + CH_4 \text{ concentration}) \times 100 \quad (8)$$

The reaction rates after each lapse of time calculated according to the equation (8) are 86.0%, 84.6%, 85.1%, 84.1%, and 82.5%. The control unit 103 calculates an approximate equation representing a relation between the lapse of time t and the reaction rate r using the respective values. The approximate equation thus obtained is expressed by the following equation (9).

$$r = -9.09 \times 10^{-9} t^2 - 4.40 \times 10^{-5} t + 85.7 \quad (9)$$

Figure 8:
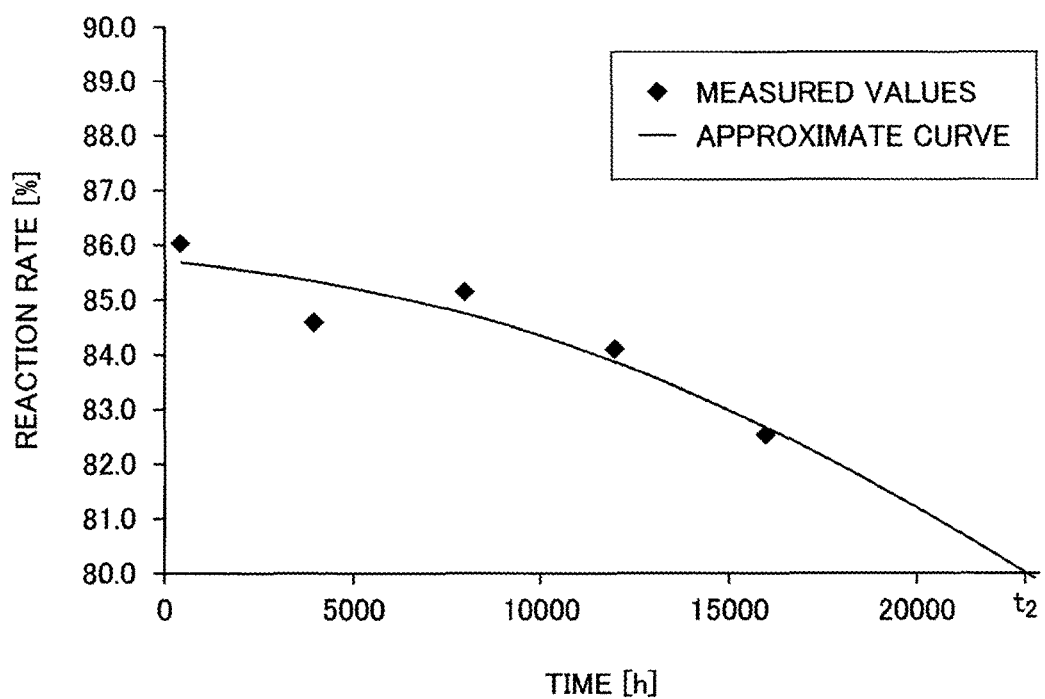
FIG. 8 is a graph of an approximate curve used for estimating a service life of a catalyst body.

FIG. 8 is a graph showing the relation between the lapse of time t (h) and the reaction rate r (%). FIG. 8 indicates the respective measured values of the reaction rates r after each lapse of time t. FIG. 8 also indicates an approximate curve representing the equation (9) calculated using the respective measured values.

A threshold of the reaction rate at the time when the catalyst bodies 41 need to be replaced is set to be 80%, for example. This threshold is preliminarily determined by the operator, and is stored in the control unit 103. The control unit 103 applies the threshold to the equation (9) to calculate the corresponding time $t_2$, as illustrated in FIG. 8. In this example, the time $t_2$ thus obtained is 22,738 hours, which is the service life of the catalyst bodies 41 when the reactor 100 executes the reaction treatment under the predetermined conditions. The operator recognizes the service life so as to presume the remaining time during which the catalyst bodies 41 can be used. If the reactor 100 has been operated for 16,000 hours at the moment, for example, the remaining time allowed then can be presumed to be 6,738 hours.

The advantageous effects according to the present embodiment are described below.

The heat treatment device according to the present embodiment causing the first fluid and the second fluid to flow therethrough, includes the heat exchange unit 3 including the first flow channels through which the first fluid flows and the second flow channels through which the second fluid flows, the heat transfer structures removably placed in the first flow channels, the first information acquisition unit connected to the inlet side or the outlet side of the first flow channels to acquire the information for specifying the temperature, the flow rate, and the composition of the first fluid which are the reference conditions after the predetermined lapses of time, the second information acquisition unit connected to the outlet side of the first flow channels to acquire the information for specifying the temperature, the flow rate, and the composition of the first fluid after each lapse of time, and the control unit 103 that calculates the heat exchange amount, the reaction rate, or the yield after each lapse of time in accordance with the temperature, the flow rate, or the composition specified according to the information acquired by the first information acquisition unit and the second information acquisition unit, so as to estimate the service life of the heat transfer structures in accordance with the heat exchange amount, the reaction rate, or the yield.

The specific material used as the first fluid or the second fluid varies depending on the type of the heat treatment device employed and the type of the target of which the service life is estimated. In the case in which the heat treatment device employed is the reactor 100 as illustrated above, and when the heat transfer structures as a target for the estimation are the heat transfer promoters 43, the first fluid is the heat medium coming into contact with the heat transfer promoters 43, and the second fluid is the reaction fluid. When the heat transfer structures as a target for the estimation are the catalyst bodies 41, the first fluid is the reaction fluid coming into contact with the catalyst bodies 41, and the second fluid is the heat medium. The first fluid and the second fluid both may be the reaction fluid depending on the type of the reactor.

Although the first flow channels and the second flow channels illustrated above are respectively the first flow channels 17 and the second flow channels 31 defined in relation to the first fluid and the second fluid, the respective reference numerals may be replaced with each other. The heat treatment device according to the present disclosure may also be used as a heat exchanger in which the first fluid and the second fluid are both the heat medium. In other words, the heat transfer structures as a target for the estimation may be heat transfer promoters placed in both of the first flow channels and the second flow channels.

With regard to the inlet side and the outlet side defined in the first flow channels, the first introduction pipe 47 corresponds to the inlet side of each first flow channel, and the first discharge pipe 51 corresponds to the outlet side of each first flow channel when the first flow channels are the first flow channels 17 in which the catalyst bodies 41 are placed. When the first flow channels are the second flow channels 31 in which the heat transfer promoters 43 are placed, the second introduction pipe 55 corresponds to the inlet side of each first flow channel, and the second discharge pipe 59 corresponds to the outlet side of each first flow channel.

The heat treatment device illustrated above as the reactor 100 is provided with the heat transfer structures that are placed in the respective flow channels in the heat exchange unit 3 and inevitably need to be replaced in due course due to degradation with the passage of time. The heat treatment device according to the present embodiment can estimate a service life of the heat transfer structures, which is a barometer indicating the most efficient timing of replacement to the operator, in accordance with the heat exchange amount, the reaction rate, or the yield after a certain lapse of time of the heat transfer structures actually used under the predetermined conditions. Accordingly, the operator can replace the heat transfer structures at the most efficient timing afterward upon the heat treatment executed under the same conditions. Namely, an economic loss, which may be caused due to a decrease in performance of the heat treatment device derived from deviation of the timing when the heat transfer structures are actually replaced from the most efficient timing of replacement, can be minimized.

The particular advantage of suppressing the economic loss can be explained according to the following two points of view. The following is a case in which at least either the first fluid or the second fluid is presumed to be the reaction fluid which is the raw material gas M, for example. First, the amount of the product contained in the reaction gas P discharged from the reaction unit 101 after the reaction treatment is barely decreased, while the same amount of the raw material gas M is constantly supplied to the reaction unit 101 during the reaction treatment in the reactor 100. Second, the supply amount of the raw material gas M necessary for producing the product or the amount of heat in the reactor 100 can be decreased even though the constant amount of the product should be produced after the reaction treatment. Since the reactor 100 can avoid supplying the excessive amount of the raw material gas M, an increase in operating cost of the reactor 100 can be minimized.

The heat treatment device according to the present embodiment uses the first information acquisition unit and the second information acquisition unit so as to estimate the service life of the heat transfer structures. The use of these units eliminates a great modification to the structure of the heat treatment device, or does not require any change to the heat transfer structures. Accordingly, the cost required for the heat treatment device itself can be minimized.

The heat treatment device according to the present embodiment uses the heat medium as the first fluid, and the heat transfer promoters 43 as the heat transfer structures.

The heat treatment device according to the present embodiment can achieve the above effects efficiently when using the first fluid and the heat transfer structures as described above.

The heat treatment device according to the present embodiment includes the second information acquisition unit which is the second temperature measurement unit 72 for measuring the temperature of the first fluid discharged from the first flow channels. The control unit 103 stores the temperature measured by the second temperature measurement unit 72 after each lapse of time, obtains the heat exchange amount after each lapse of time in accordance with the temperature measured by the second temperature measurement unit 72, calculates a first approximate equation representing the relation between the lapse of time and the heat exchange amount, and applies, to the first approximate equation, the predetermined threshold of the heat exchange amount at the time when the heat transfer promoters 43 need to be replaced, so as to estimate the service life of the heat transfer promoters 43.

The first approximate equation corresponds to the equation (7) described above, for example.

The heat treatment device according to the present embodiment can estimate particularly the service life of the heat transfer promoters 43 with greatest possible accuracy.

The heat treatment device according to the present embodiment also includes the first information acquisition unit which includes the first temperature measurement unit 70 for measuring the temperature of the first fluid introduced to the first flow channels and the flow rate measurement unit 71 for measuring the flow rate of the first fluid introduced to the first flow channels. The control unit 103 determines whether the reference conditions are fulfilled in accordance with the temperature measured by the first temperature measurement unit 70 and the flow rate measured by the flow rate measurement unit 71.

The heat treatment device according to the present embodiment can determine whether the reference conditions are fulfilled using the first temperature measurement unit 70 and the like particularly when estimating the service life of the heat transfer promoters 43, so as to improve the accuracy of the estimation.

The heat treatment device according to the present embodiment uses the reaction fluid as the first fluid, and the catalyst bodies 41 as the heat transfer structures.

The heat treatment device according to the present embodiment can achieve the above effects efficiently when using the first fluid and the heat transfer structures as described above.

The heat treatment device according to the present embodiment includes the second information acquisition unit which is the composition analysis unit 74 for analyzing the composition of the first fluid discharged from the first flow channels.

The control unit 103 stores the composition analyzed by the composition analysis unit 74 after each lapse of time, obtains the reaction rate or yield after each lapse of time in accordance with the composition analyzed by the composition analysis unit 74, calculates a second approximate equation representing the relation between the lapse of time and the reaction rate or yield, and applies, to the second approximate equation, the predetermined threshold of the reaction rate or yield at the time when the catalyst bodies 41 need to be replaced, so as to estimate the service life of the catalyst bodies 41.

The second approximate equation corresponds to the equation (9) described above, for example.

The heat treatment device according to the present embodiment can estimate particularly the service life of the catalyst bodies 41 with greatest possible accuracy.

The heat treatment device according to the present embodiment also includes the first information acquisition unit which is the third temperature measurement unit 73 for measuring the temperature of the first fluid discharged from the first flow channels. The control unit 103 determines whether the reference conditions are fulfilled in accordance with the temperature measured by the third temperature measurement unit 73.

The heat treatment device according to the present embodiment can determine whether the reference conditions are fulfilled using the third temperature measurement unit 73 particularly when estimating the service life of the catalyst bodies 41, so as to improve the accuracy of the estimation.

The heat treatment device according to the present embodiment includes the heat exchange unit 3 which includes the heat transfer bodies, in which the first flow channels and the second flow channels are grooves or penetration holes provided in the respective heat transfer bodies.

The heat exchange unit 3 according to the present embodiment includes two kinds of heat transfer bodies alternately stacked, including the first heat transfer bodies 7 provided with the first flow channels 17 through which the first fluid flows and the second heat transfer bodies 9 provided with the second flow channels 31 through which the second fluid flows, for example. The respective flow channels in the heat transfer bodies described above are preferably grooves in view of the facilitation of manufacture.

The present disclosure is not limited to the heat exchange unit 3 including the heat transfer bodies having the above configuration. For example, the present disclosure may be applicable to a case in which the heat exchange unit 3 includes a single cuboidal heat transfer body provided with both of the first flow channels through which the first fluid flows and the second flow channels through which the second fluid flows. The respective flow channels in this case are penetration holes.

The heat treatment device according to the present embodiment can achieve the effects described above particularly when the heat exchange unit 3 includes either a single cuboidal heat transfer body or a plurality of heat transfer bodies directly stacked on one another to be integrated together.

Second Embodiment

A heat treatment device according to a second embodiment of the present disclosure is described below. The reactor 100 illustrated above as the heat treatment device according to the first embodiment includes the reaction unit 101 that includes only one heat exchange unit 3. The present disclosure is not limited to the reactor including a single heat exchange unit, and may be applied to a reactor including a plurality of heat exchange units provided independently.

Figure 9:
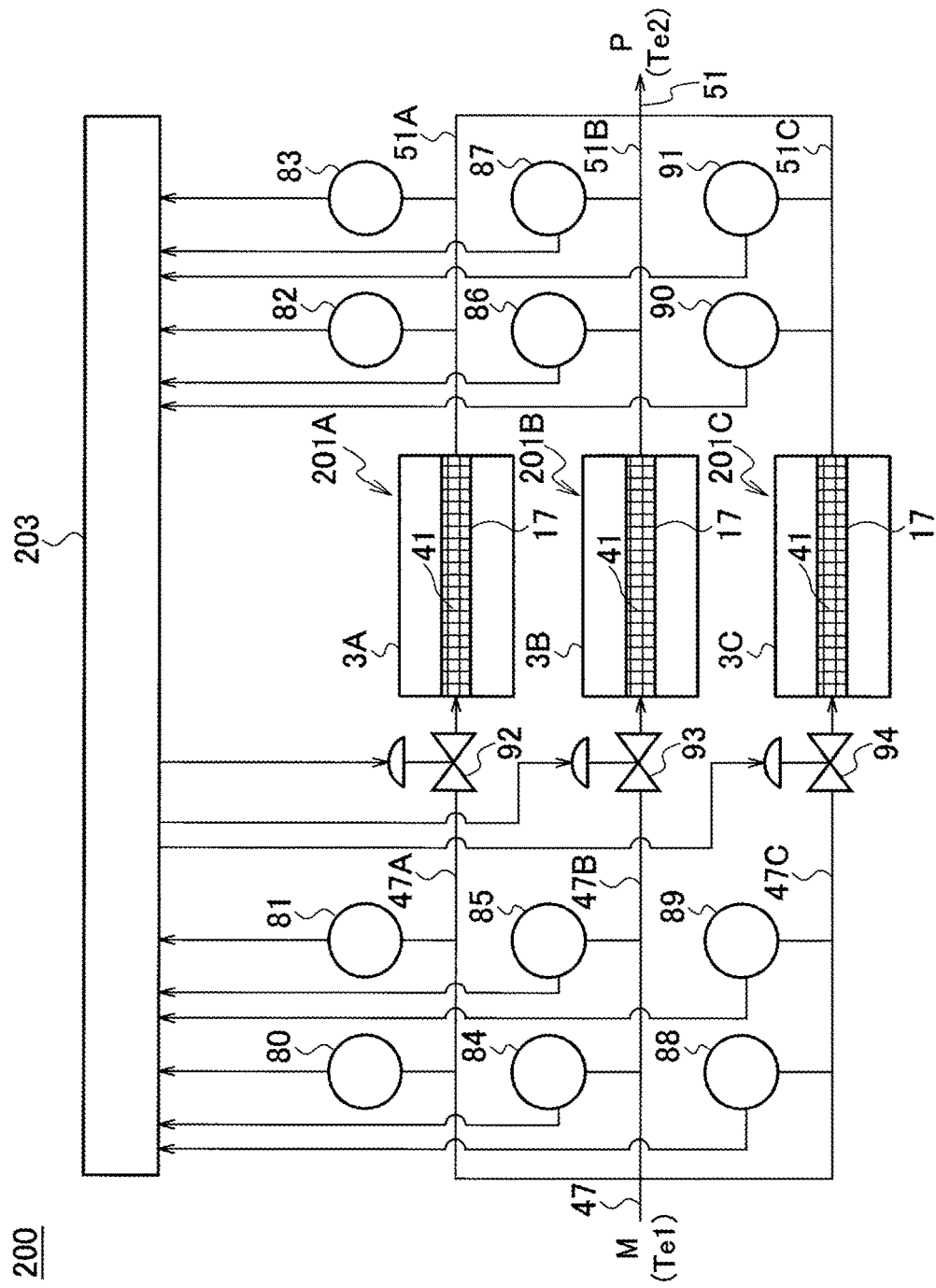
FIG. 9 is a diagram illustrating a structure of first flow channels in a reactor according to a second embodiment.

FIG. 9 is a schematic view illustrating a structure of a reactor 200 according to the second embodiment. The reactor 200 illustrated in FIG. 9 includes three heat exchange units 3A to 3C, for example. FIG. 9 illustrates a structure of flow pipes for a raw material gas M and a reaction gas P communicating with the first flow channels 17 included in the respective heat exchange units 3A to 3C. The present embodiment is illustrated below with a case in which a service life of the catalyst bodies 41 placed in the respective heat exchange units 3A to 3C is estimated individually. FIG. 9 omits the indication of the second flow channels included in the respective heat exchange units 3A to 3C and the flow channel pipes for a heat medium communicating with the respective second flow channels for brevity to describe the purpose of the present embodiment.

The reactor 200 includes three reaction units 201A to 201C each including one of the heat exchange units 3A to 3C. The first introduction pipe 47 includes three introduction branch parts of a first introduction branch part 47A to a third introduction branch part 47C, each branching to be connected to one of the reaction units 201A to 201C. Similarly, the first discharge pipe 51 includes three discharge branch parts of a first discharge branch part 51A to a third discharge branch part 51C, each branching to be connected to one of the reaction units 201A to 201C. Each of the reaction units 201A to 201C may have the same structure as the reaction unit 101 according to the first embodiment.

The reactor 200 includes, with regard to the reaction unit 201A, a first flow rate measurement unit 80 for measuring the flow rate of the raw material gas M flowing through the pipe, and a first composition analysis unit 81 for analyzing the composition of the raw material gas M. The first flow rate measurement unit 80 and the first composition analysis unit 81 are arranged in the first introduction branch part 47A. The reactor 200 also includes a first flow rate regulation valve 92 capable of regulating the flow rate of the raw material gas M. The first flow rate regulation valve 92 is arranged between the first composition analysis unit 81 in the first introduction branch part 47A and the reaction unit 201A. The reactor 200 further includes a first temperature measurement unit 82 for measuring the temperature of the reaction gas P flowing through the pipe, and a second composition analysis unit 83 for analyzing the composition of the reaction gas P. The first temperature measurement unit 82 and the second composition analysis unit 83 are arranged in the first discharge branch part 51A.

The reactor 200 includes, with regard to the reaction unit 201B, a second flow rate measurement unit 84 for measuring the flow rate of the raw material gas M flowing through the pipe, and a third composition analysis unit 85 for analyzing the composition of the raw material gas M. The second flow rate measurement unit 84 and the third composition analysis unit 85 are arranged in the second introduction branch part 47B. The reactor 200 also includes a second flow rate regulation valve 93 capable of regulating the flow rate of the raw material gas M. The second flow rate regulation valve 93 is arranged between the third composition analysis unit 85 in the second introduction branch part 47B and the reaction unit 201B. The reactor 200 further includes a second temperature measurement unit 86 for measuring the temperature of the reaction gas P flowing through the pipe, and a fourth composition analysis unit 87 for analyzing the composition of the reaction gas P. The second temperature measurement unit 86 and the fourth composition analysis unit 87 are arranged in the second discharge branch part 51B.

The reactor 200 includes, with regard to the reaction unit 201C, a third flow rate measurement unit 88 for measuring the flow rate of the raw material gas M flowing through the pipe, and a fifth composition analysis unit 89 for analyzing the composition of the raw material gas M. The third flow rate measurement unit 88 and the fifth composition analysis unit 89 are arranged in the third introduction branch part 47C.

The reactor 200 also includes a third flow rate regulation valve 94 capable of regulating the flow rate of the raw material gas M. The third flow rate regulation valve 94 is arranged between the fifth composition analysis unit 89 in the third introduction branch part 47C and the reaction unit 201C. The reactor 200 further includes a third temperature measurement unit 90 for measuring the temperature of the reaction gas P flowing through the pipe, and a sixth composition analysis unit 91 for analyzing the composition of the reaction gas P. The third temperature measurement unit 90 and the sixth composition analysis unit 91 are arranged in the third discharge branch part 51C.

The flow rate regulation valves 92 to 94 are each an electromagnetic valve, for example. The respective flow rate regulation valves 92 to 94 change the aperture in accordance with a signal from a control unit 203 described below. The respective flow rate measurement units 80, 84, and 88, the respective temperature measurement units 82, 86, and 90, and the respective composition analysis units 81, 83, 85, 87, 89, and 91 according to the present embodiment have substantially the same structures as the corresponding units according to the first embodiment.

The reactor 200 further includes the control unit 203 for controlling the entire operation of the reactor 200. The control unit 203 according to the present embodiment is in particular electrically connected to all of the respective flow rate measurement units 80, 84, and 88, the respective temperature measurement units 82, 86, and 90, the respective composition analysis units 81, 83, 85, 87, 89, and 91, and the respective flow rate regulation valves 92 to 94.

The control unit 203 estimates the service life of the catalyst bodies 41 placed in the respective heat exchange units 3 individually. The fundamental operation of estimating the service life of the catalyst bodies 41 placed in the respective heat exchange units 3 is substantially the same as that illustrated as the second operation in the first embodiment. According to the present embodiment, the first introduction pipe 47 located on the upstream side branches into the three introduction branch parts 47A to 47C along the pipe. The control unit 203 thus needs to particularly specify the composition of the raw material gas M flowing through the respective introduction branch parts 47A to 47C to use as the basis when the respective composition analysis units 83, 87, and 91 placed in the respective discharge branch parts 51A to 51C analyze the composition of the reaction gas P.

Since the reactor 200 includes the respective flow rate regulation valves 92 to 94, the control unit 203 can regulate the flow rate of the raw material gas M by the respective flow rate regulation valves 92 to 94 in accordance with the estimation results of the service life, so as to control a load in the respective reaction units 201A to 201C. The control of the load can lead the service life of the catalyst bodies 41 placed in the respective heat exchange units 3 to conform to each other to some extent. The control unit 203 can also recognize the flow rate of the raw material gas M currently flowing through the respective introduction branch parts 47A to 47C or determine whether the flow rate of the raw material gas M flowing through the respective introduction branch parts 47A to 47C is appropriate, in accordance with the flow rate measured by the respective flow rate measurement units 80, 84, and 88.

The reactor 200 according to the present embodiment can individually estimate the service life of the catalyst bodies 41 independently placed in the respective heat exchange units 3, as in the case illustrated in the first embodiment.

Although the present embodiment has been illustrated with the case in which the reactor 200 estimates the service life of the catalyst bodies 41, the reactor 200 can estimate the service life of the heat transfer promoters 43. Although the reactor 200 according to the present embodiment includes the three reaction units 201, namely, the three heat exchange units 3, the number of the units may be two or more than three.

Other Embodiments

The first embodiment has been illustrated with the case capable of estimating the service life of both of the heat transfer promoters 43 and the catalyst bodies 41. Alternatively, the reactor 100 may only estimate the service life of either the heat transfer promoters 43 or the catalyst bodies 41. The same can be applied to the reactor 200 according to the second embodiment.

The respective embodiments described above have been illustrated with the reactors 100 and 200 that execute the reaction treatment through the exothermic reaction, but may be applicable to a case of executing reaction treatment through an endothermic reaction. The second fluid thus may be either a heating fluid or a cooling fluid.

The respective embodiments described above have been illustrated with the gas chromatograph used as the composition analysis unit 74 and the other analysis units for analyzing the composition of the reaction gas P. The composition analysis unit 74 and the other analysis units are not limited to the gas chromatograph, and may be a gas analyzer for particular gas, such as an oxygen analyzer or a methane analyzer, so as to analyze the concentration of each gas contained in the reaction gas.

The respective embodiments described above have been illustrated with the case in which the control unit 103 stores the information acquired from the temperature measurement unit or the composition analysis unit corresponding to the second information acquisition unit after each lapse of time. The control unit 103 does not necessarily acquire and store the information after the predetermined lapses of time, but may continuously acquire and store the information from the second information acquisition unit, and extract the information after a particular lapse of time so as to use the corresponding information for the estimation of the service life of the structures.

The respective embodiments described above have been illustrated with the case in which the heat exchange unit 3 has a counter flow-type structure in which the first fluid flows in the first flow channels 17 in the direction opposite to the flowing direction of the second fluid flowing in the second flow channels 31, but the heat exchange unit 3 may have a parallel flow-type structure in which the respective fluids flow in the same direction. The present disclosure thus can be applicable to any case in which the first fluid and the second fluid flow in either direction.

The respective embodiments described above have been illustrated with the case in which the first heat transfer bodies 7 and the second heat transfer bodies 9 composing the heat exchange unit 3 are alternately stacked on one another in the Z direction which is the vertical direction, but the present disclosure is not limited to this case. For example, several sets of the respective heat transfer bodies composing the heat exchange unit 3 and transversely connected to each other may be stacked in the Z direction.

It should be understood that the present disclosure includes various embodiments which are not disclosed herein. Therefore, the scope of the present disclosure is defined only by the matters according to the claims reasonably derived from the description above.

What is claimed is:

1. A heat treatment device causing a first fluid and a second fluid to flow therethrough, the device comprising:
    a heat exchange unit including a first flow channel through which the first fluid flows and a second flow channel through which the second fluid flows;
    a heat transfer structure removably placed in the first flow channel;
    a first information acquisition unit connected to an inlet side or an outlet side of the first flow channel to acquire information for specifying a temperature, a flow rate, or a composition of the first fluid which is a reference condition after lapses of time;
    a second information acquisition unit connected to the outlet side of the first flow channel to acquire the information for specifying the temperature, the flow rate, or the composition of the first fluid after each lapse of time; and
    a control unit that calculates a heat exchange amount, a reaction rate, or a yield after each lapse of time in accordance with the temperature, the flow rate, or the composition specified according to the information acquired by the first information acquisition unit and the second information acquisition unit, so as to estimate a service life of the heat transfer structure in accordance with the heat exchange amount, the reaction rate, or the yield.

2. The heat treatment device according to claim 1, wherein:
    the first fluid is a heat medium; and
    the heat transfer structure is a heat transfer promoter.

3. The heat treatment device according to claim 2, wherein:
    the second information acquisition unit is a second temperature measurement unit that measures the temperature of the first fluid discharged from the first flow channel;
    the control unit stores the temperature measured by the second temperature measurement unit after each lapse of time;
    the control unit obtains the heat exchange amount after each lapse of time in accordance with the temperature measured by the second temperature measurement unit;
    the control unit calculates a first approximate equation representing a relation between each lapse of time and the heat exchange amount; and
    the control unit applies, to the first approximate equation, a predetermined threshold of the heat exchange amount at a time when the heat transfer promoter needs to be replaced, so as to estimate the service life of the heat transfer promoter.

4. The heat treatment device according to claim 3, wherein:
    the first information acquisition unit includes a first temperature measurement unit that measures the temperature of the first fluid introduced to the first flow channel, and a flow rate measurement unit that measures the flow rate of the first fluid introduced to the first flow channel; and
    the control unit determines whether the reference condition is fulfilled in accordance with the temperature measured by the first temperature measurement unit and the flow rate measured by the flow rate measurement unit.

5. The heat treatment device according to claim 1, wherein:
    the first fluid is a reaction fluid; and
    the heat transfer structure is a catalyst body.

6. The heat treatment device according to claim 5, wherein:
    the second information acquisition unit is a composition analysis unit that analyzes the composition of the first fluid discharged from the first flow channel;
    the control unit stores the composition analyzed by the composition analysis unit after each lapse of time;
    the control unit obtains the reaction rate or the yield after each lapse of time in accordance with the composition analyzed by the composition analysis unit;
    the control unit calculates a second approximate equation representing a relation between each lapse of time and the reaction rate or the yield; and
    the control unit applies, to the second approximate equation, a predetermined threshold of the reaction rate or the yield at a time when the catalyst body needs to be replaced, so as to estimate the service life of the catalyst body.

7. The heat treatment device according to claim 6, wherein:
    the first information acquisition unit is a third temperature measurement unit that measures the temperature of the first fluid discharged from the first flow channel; and
    the control unit determines whether the reference condition is fulfilled in accordance with the temperature measured by the third temperature measurement unit.

8. The heat treatment device according to claim 1, wherein:

the heat exchange unit includes a heat transfer body; and
the first flow channel and the second flow channel are grooves or penetration holes provided in the heat transfer body.

\* \* \* \* \*